United States Patent [19]

Marquardt et al.

[11] Patent Number: 4,655,098

[45] Date of Patent: Apr. 7, 1987

[54] DRIVE MECHANISM FOR A CIRCUIT BREAKER USING ECCENTRIC MEMBER AND DIRECTIONAL LOCK

[75] Inventors: Ulrich Marquardt; Ralf Seebold, both of Berlin, Fed. Rep. of Germany

[73] Assignee: Siemens Aktiengesellschaft, Berlin and Munich, Fed. Rep. of Germany

[21] Appl. No.: 771,941

[22] Filed: Sep. 3, 1985

[30] Foreign Application Priority Data

Sep. 3, 1984 [DE] Fed. Rep. of Germany ....... 3432696

[51] Int. Cl.[4] .............................................. F16H 27/00

[52] U.S. Cl. ..................................... 74/163; 74/84 R; 74/141; 74/625; 200/153 SC

[58] Field of Search ............... 74/625, 163, 141, 84 R; 200/153 SC, 153 G, 153 H

[56] References Cited

U.S. PATENT DOCUMENTS

| | | | |
|---|---|---|---|
| 2,080,665 | 5/1937 | Larsen | 74/163 X |
| 3,124,996 | 3/1964 | Devine | 74/136 |
| 3,301,984 | 1/1967 | Wilson | 200/153 |
| 3,340,743 | 9/1967 | Stageberg | 74/141 X |
| 3,729,065 | 4/1973 | Baskerville | 400/153 SC X |
| 4,146,764 | 3/1979 | Wilson | 74/625 X |

FOREIGN PATENT DOCUMENTS

| | | |
|---|---|---|
| 1490720 | 12/1969 | Fed. Rep. of Germany . |
| 2935368 | 3/1981 | Fed. Rep. of Germany . |
| 756886 | 12/1933 | France . |
| 1344785 | 10/1963 | France . |
| 1347857 | 11/1963 | France . |

*Primary Examiner*—Richard J. Scanlan, Jr.
*Attorney, Agent, or Firm*—Volker R. Ulbrich

[57] ABSTRACT

A drive mechanism for a circuit breaker has a spring which is to be tensioned by means of a shaft. On said spring sits a clamp-roll freewheel as a directional lock, whose outer part is connected via a flexible strip traction member to one or more eccentric members. The clamp rollers can be pressed out of their operating position by means of cage disks, which occurs upon reaching the end position of the spring-tensioning shaft by means of a release lever in connection with toggle levers.

13 Claims, 4 Drawing Figures

DRIVE MECHANISM FOR A CIRCUIT BREAKER USING ECCENTRIC MEMBER AND DIRECTIONAL LOCK

BACKGROUND OF THE INVENTION

The invention relates to the field of circuit breakers and more particularly to a drive mechanism for a circuit breaker with a spring which is tensionable by means of a crank top seated on a shaft through a rotatingly drivable eccentric member, a transmission member and a directional lock seated on the shaft.

Drive mechanisms of this type are used in many different designs in order to tension a relatively strong spring, with sufficient energy potential to turn the circuit breaker on and off again either manually or with the aid of a small motor. Thus the drive mechanism can function as a step drive, in which after the motor is turned on, the spring is tensioned far enough to store the required energy for the subsequent release of the switch mechanism. Alternatively the drive mechanism can operate as a storage drive, in which the energy stored by the spring can be released in any desired manner at a desired moment for switching. Such drive mechanisms are produced generally in very similar designs for both low- and medium-voltage circuit breakers. An example of such a drive mechansim can be seen in a low-voltage circuit breaker disclosed in U.S. Pat. No. 3,301,984. In that circuit breaker, the transmission member is a rod driven by an eccentric crank pin which acts on the supports of a drive catch movable around the shaft, locking into the cogs of a ratchet wheel and further rotating said wheel stepwise as a result of the to-and-fro movement of the rod.

A locking catch working similarly on the cogs thereby prevents reverse rotation of the ratchet wheel under the influence of the spring to be tensioned. Because of the high reliability requirements and durability of drive mechanisms of the type considered here, considerable expense on the accuracy of the mutually activated parts and on their resistance to deformation and wear cannot to be avoided. In particular, careful alignment of the transmission member stroke to the ratchet wheel divisions is required. If the transmission member stroke is too small, the ratchet wheel is not rotated further, while an uneconomic idle stroke occurs if the transmission member stroke is too large in relation to the ratchet wheel divisions. Moreover, in this case the ratchet wheel cogs, drive catch and its bearing will be subjected to excessive strain. A further problem is created by the transmission member, which on the one hand can hinder desired positioning of certain circuit breaker components within the rather sophisticated overall assembly, and on the other hand is the source of unavoidable length tolerance problems.

In mechanical engineering it is well known that by utilizing flexible traction and directional lock, a to-and-fro motion can be converted to a stepwise unidirectional rotary motion, see French Patent No. A-756,886. For traction, chains are used guided via chain wheels which incorporate a clamp-roll freewheel serving as directional lock. The chains are held tight by a spring and the chain wheels actuated by restoring force.

It is an object of the invention to eliminate the length tolerance problem, and the massiveness and cumbersomeness characteristics of reliable and durable equipment found in drive mechanisms of the initially named type by use of said flexible traction.

SUMMARY OF THE INVENTION

Briefly stated in accordance with one aspect of the invention, the aforementioned objects are achieved by providing a drive mechanism for a circuit breaker having a spring, tensionable by means of a crank pin seated upon a shaft through a first rotatingly driveable eccentric member by a transmission member and a directional lock seated on the shaft. A flexible traction member is connected to the directional lock serving as the transmission member, and an additional eccentric seated on a shaft of a hand lever, located between the first eccentric member and the directional lock, said additional eccentric being at least partially wrapped around by the traction member.

In a drive mechanism of the type specified, the use of a flexible traction as transmission member has the surprising advantage that the transmission members need no longer be manufactured as precise prefabricated components, possibly with an adjusting device for their effective length, but that after assembly of the remaining parts a practically tolerance-free adjustment can be obtained by the selection of a suitable traction length. The property of flexibility also permits—in contrast to massive rod-shaped transmission members—application of power through a motor and a hand lever either in a straightforward or complex twisted path, thus achieving greater freedom of design in switchgear component layout.

For example, the traction member can be installed such that a section of suitable length is fastened at one end on the eccentric and at the other on the drive component of the directional lock. However, based on a further embodiment of the invention it is preferrable to position the traction member at least partially wrapped around one of the eccentric members provided as thrust support and to fasten both ends of the traction member to the drive component of the directional lock. Thus one fastening point is eliminated, and by wrapping around the eccentric an especially favorable application of power is achieved in the eccentric as well as in the traction member. Then, depending on the selected traction member guidance, at least on the drive component of the directional lock both ends of the traction member lie either on top of each other or next to each other.

In a further embodment, the drive mechanism can be provided with an additional traction guide mechanism. In the form of a simple roller the guide mechanism permits such guiding of the traction member within the circuit breaker that the spatial requirement is minimal and other components can be avoided.

The guide mechanism can be adjutably positioned with a driving force for activating the traction member. Thus, without any additional transmission member a further possibility for tensing the storage spring is available.

Friction loss in a drive mechanism in accordance with the invention can be maintained at an especially low level in that the eccentrically positioned members and, if present, the guide mechanism are provided with an outer ring of a rolling bearing as support for the traction member. Suitable for this purpose are for example the well-known needle bearings, where thickness is only small so that the dimensions of the parts to be fitted therewith are only very slightly increased.

As already mentioned, traction mechanisms exist in various designs. Specially suited, however, to the purposes of a drive mechanism of the type described is a steel strip, because this material displays very low bendng stiffness at high tensile strength and requires no expensive components for lateral guidance. In connection herewith a restoring force is provided that activates the drive component of the directional lock with the aim of tensing the traction member, thereby tightening the steel strip. While this spring must be additionally overcome by the power source, i.e., by motor or human operator, it appears in practise that the expense for said traction-tensioning spring is extraordinarily small in relation to the power requirement of the complete installation and is therefore negligible.

It has already been shown that ratchet wheels connected with drive and locking catches are installed as directional locks in circuit breaker drive mechanisms. It is, however, particularly advantageous in accordance with the invention to provide a clamp-roll or clamp-structure freewheel as a directional lock. Freewheels of this type are commonly known as machine components, as for example in the Stieber Praezision GmbH catalog, pages 5, 6, 14 and 15. As in contrast to ratchets locks, said freewheel couplings are not bound to a set rotational angle, the capability exists to achieve greater or smaller directional lock switching steps simply by varying eccentricity of the traction-driving eccentric. In this case the directional lock itself requires no alteration. It is recommended in this context that an equal clamp-roll or clamp-structure freewheel be employed to block reverse rotation of the shaft.

In relationship to the clamp-roll or clamp-structure freewheel, the clamp rolls or clamp structures can be movable to an ineffective position by means of at least one actuator dependent on the final shaft position. Clamp-roll freewheels with clamp rolls that can be decoupled are well (see German catalog "Freewheels," Stieber Praezision GmbH, page 75).

For this purpose it is suitable to utilize the small angular rotation that the shaft transverses from leaving the dead center of its crank pin connected to the spring to be tensioned up to the blocking by an detachable stop.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF A PREFERRED EMBODIMENT

Figure 1:
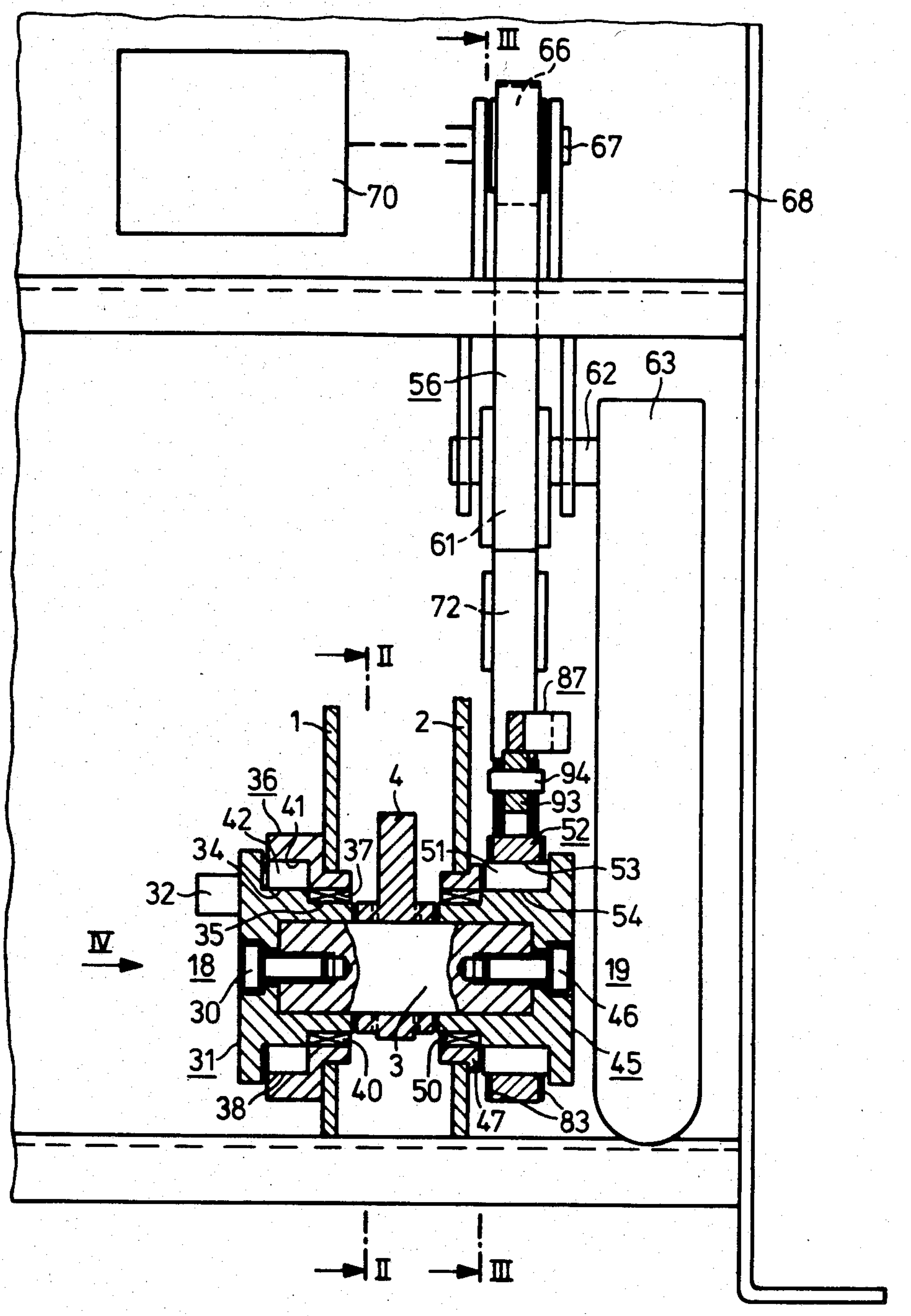
FIG. 1 shows a drive mechanism in accordance with the invention in longitudinal section and in partial view, wherein the sectional planes of two sections as well as the direction of view of a detail are indicated.
Figure 2:
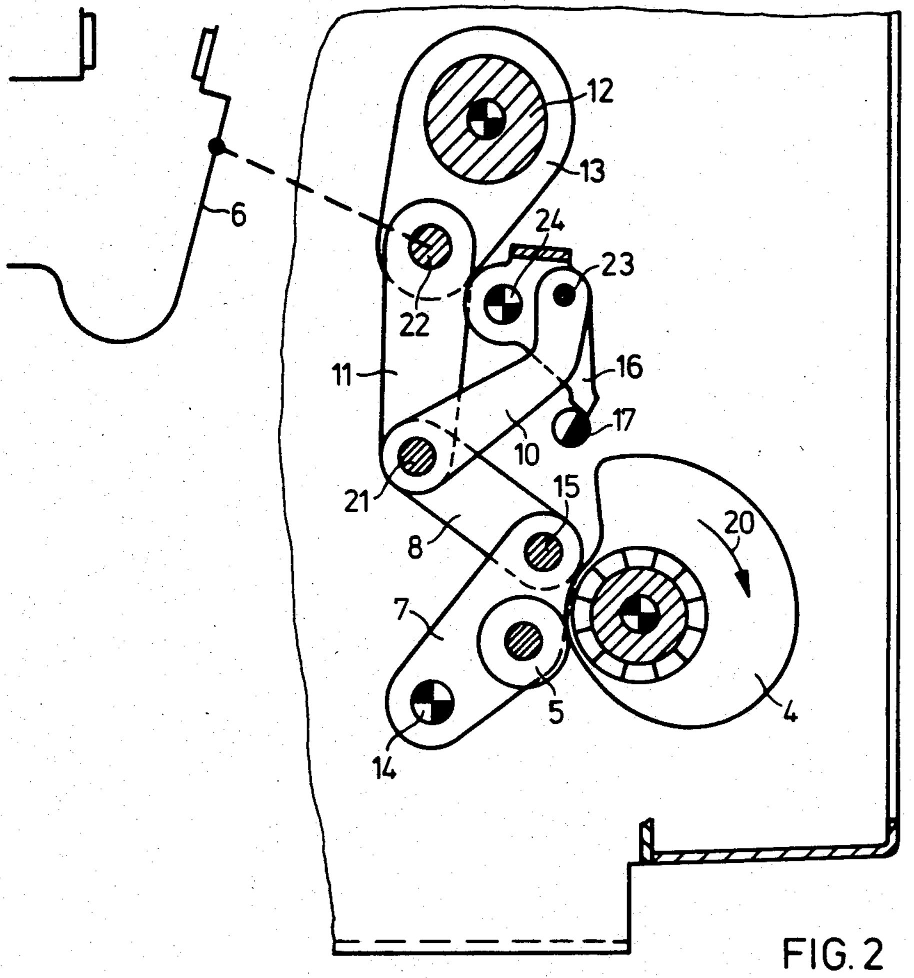
FIG. 2 is a section of the drive mechanism according to FIG. 1 in planes II—II.

In FIG. 1 two walls 1 and 2 are shown in cross section and placed at a distance parallel to each other, which form part of a low-voltage circuit breaker. In the bearing openings of said walls a shaft 3 is mounted on which a cam 4 is rotatably fastened. As seen in FIG. 2, the cam 4 functions in the known fashion in conjunction with a roller 5 resting on its circumference in order to move a contact lever 6 which is schematically displayed into the switched-on position. This transpires with the help of a lever apparatus best seen in FIG. 2, comprising the toggle levers 7 and 8, a support rocker 10, an intermediate lever 11, and a crank rocker 13 or several crank rockers seated on a switch shaft 12. Roller 5 is mounted on the lower toggle lever 7 which can be rotated around a fixed-position bearing 14. It could also be mounted, for example, on the toggle joint bolt 15 pivotally connecting the toggle levers 7 and 8. The support rocker 10, whose other end is pivotally mounted on a locking lever 16, impacts on the connecting joint 21 of upper toggle level 8 and the intermediate lever 11. The locking lever 16 in turn is supported by a release shaft 17.

If the cam 4 is rotated away from the displayed open position in the direction of arrow 20, the toggle levers 7 and 8 are extended, whereby the intermediate lever 11 will be simultaneously displaced via the joint 21 and thereby the crank rocker 13 will be rotated clockwise via the joint 22. The joint 21 will thus be guided by means of a support rocker 10 in a circular arc around the joint 23 located on the locking lever 16.

If after closure of contact lever 6 the release shaft 17 is rotated away from the switched-on position clockwise so far that the locking lever 16 loses its hold, the locking lever 16 is pivoted clockwise around the fixed-position bearing 24 under the influence of the force carried by the joint 21, the force being transmitted via the support rocker 10 to the locking lever 16. This results in the opening of the contact lever 6 through the counter-clockwise rotation of the switch shaft 12.

Figure 4:
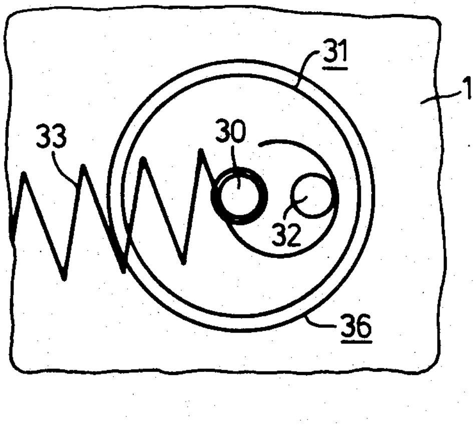
FIG. 4 is a detail of the drive mechanism according to FIG. 1 is shown corresponding to the arrow IV.

FIG. 1 will be considered in further detail below. It shows that the shaft 3 is mounted with it surface not in immediate contact with the bearing openings of the walls 1 and 2, but through insertion of cylinder-like parts which belong to two clamp-roll freewheels 18 and 19. Fastened to the left-hand end of the shaft 3 by means of a screw 30 is the shaft-seated sleeve-like inner part 31 of a clamp-roll freewheel 18, whose outer frontal side bears an eccentrically positioned retaining bolt 32 for the spring 33 to be tensioned. This is shown broken out in FIG. 4 which shows a view of the clamp-roll freewheel 18 according to FIG. 1 in the direction of arrow IV. The inner part 31 is provided with two offsets of different diameters running axially reset to each other concentric to the longitudinal axis of shaft 3. The hereby formed circumferential surfaces 34 and 35 are overlapped by the outer part 36 of the freewheel 18 which is firmly connected to the wall 1. A needle bearing holder 40 is positioned between the circumferential surface 35 of the inner part 31 and an inner surface 37 of the outer part 36 for rotational bearing of the shaft 3, thus forming a rolling bearing. Between the inner circumference 41 of the outer part 36 and the circumferential surface 34 of the inner part 31 several clamp rolls 42 are located in recesses 38 (FIG. 1) with a shape typical for clamp-roll freewheels, the rollers permitting in known fashion only a unidirectional rotation of the shaft 3.

Positioned on the right hand end of the shaft 3 in FIG. 1 is an additional clamp-roll freewheel 19, showing parts similar to those of clamp-roll freewheel 18, but displaying additional functions. In particular, a drive force is introduced into clamp-roll freewheel 19, and a mechanism is provided for random disengagement of the coupling between outer and inner parts of the clamp roll freewheel 19. In addition, the clamp-roll freewheel 19 also possesses an inner part 45, which apart from somewhat different dimensions generally corresponds to the inner part 31 and is similarly fastened to the shaft 3 by means of a screw 46. For mounting the inner part 45 in the sidewall 2 there is a sleeve 47 fitted into the sidewall 2 and a needle bearing holder 50. Also available are the clamp rolls 51 corresponding to the clamp rollers 42, which are respectively pressed by a compression spring 57 (FIG. 3) into the narrowing part of recesses 58 (FIG. 3), located on the inner circumference 53 of the outer part 52. The outer part 52 of the freewheel 19 is made up differently on account of the additional functions. First, recesses 58 are provided in the known fashion on the inner circumferences 53 of the outer part 52 for the clamp rollers 51, whose radial height varies in that on rotating the assembly in the one direction, the clamp rollers are stuck fast between the inner circumference 53 of the outer part 52 and the circumferential surface 54 of the inner part 45, whereas on rotating in the opposite direction no coupling is effected.

Figure 3:
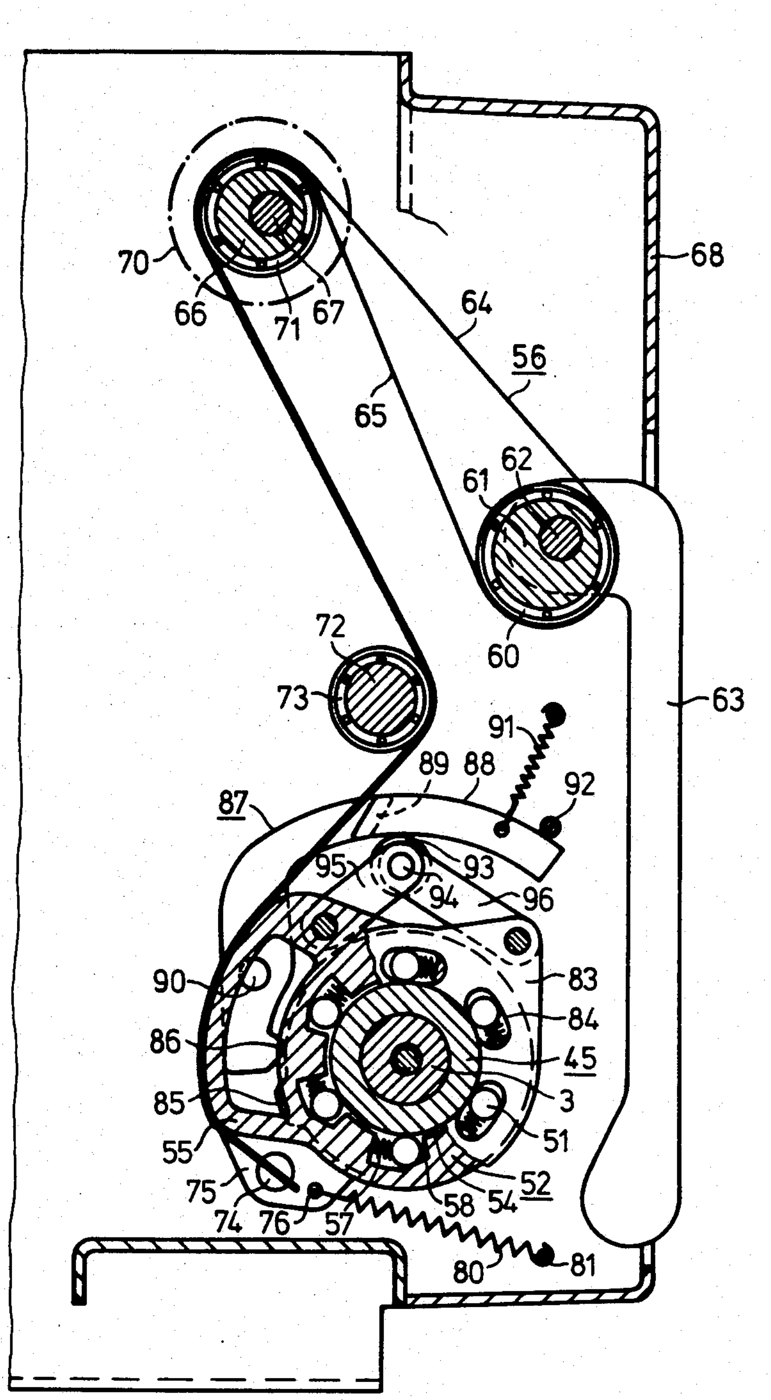
FIG. 3 is a section through the drive mechanism according to FIG. 1 in planes III—III.

Reference to the further features of the just described clamp-roll freewheel 19 is made in FIG. 3 which represents a section of the assembly accoding to FIG. 1 along the planes III—III. As can be seen, the outer part 52 of the freewheel 19 is provided with a flange 55 for increasing the effective lever arm, extending over part of the circumference of the outer part 52 and forming a concentrically running bearing surface for a flexible steel strip 56 provided as a traction member.

Prior to any further explanation of the clamp-roll freewheel 19 of FIG. 1 on the right-hand end of shaft 3. The assembly of this traction member 56 will be considered initially with the help of FIG. 3. The traction member 56 wraps with an angle of somewhat more than 180 degrees around the outer ring 60 of a rolling bearing, whose inner ring is formed by an eccentric member 61. The latter is fastened to the shaft 62 of a rigid lever 63. The shaft 62 is mounted in the partially schematically shown housing 68 of the low-voltage circuit breaker. Both ends 64 and 65 also wrap together around a further eccentric member 66 fastened on the shaft 67. The shaft 67 can be the shaft of a motor 70 or of an intermediate gear driven by the motor 70. Further, the outer ring 71 of a rolling bearing is inserted between the traction member 56 and the eccentric member 66. Positioned in the space between the eccentric member 66 and the shaft 3 is a guide mechanism for the traction member 56, consisting of a fixed-mounted bolt 72 and an additional rolling bearing outer ring 73. Both ends 64 and 65 of the traction member 56 lie on top of each other on the flanges 55 of the outer part 52 and are connected by means of a slit clamp pin 74 firmly to the outer part 52. A flange 75 carrying the clamp pin 74 on the outer part 52 also contains an opening 76 for affixing a tension spring 80, for whose other end a pin 81 firmly fastened to the housing 68 is provided as counter-bearing. The tension spring is dimensioned such that the traction member 56 is stretched tight and thus runs tangentially to the rolling rings 60, 71 and 73 as well as to the flange 55.

If, for example, the eccentric member 66 is set in rotation by means of the shaft 67, the traction member 56 will be moved periodically by the measure of eccentricity of the eccentric member 66. Said motion is expressed in conjunction with the spring 80 in an alternately clockwise and counter-clockwise swivel of the outer part 52. Hereby due to the concentric format of the flange 55, the traction member 56 operates with a constant lever arm. Clockwise swivel of the outer part 52 effects a similarly clockwise rotation of the shaft 3 by means of the clamp rollers 51.

The spring 33 (FIG. 4) is thus correspondingly tensioned. The tension thus arrived at is maintained by the already described clamp-roll freewheel 18 located at the left-hand end of shaft 3. Consequently, when swivelling the outer part 52 counter-clockwise, the shaft 3 can hold its position. During said idle stroke the clamp rollers 51 glide on the outer surface 54 of the inner part 45.

During the procedure described above the traction member 56 is supported on the eccentric member 61 of the hand lever 63. In likewise fashion a stepwise tensioning of spring 33 (FIG. 4) can now be effected by means of the eccentric member 61 via the hand lever 63, in which the eccentric member 66 functions as counter-bearing and the roller ring 71 situated on it as guide roller. The greatest possible tension of spring 33 is reached when the eccentric bolt 32 is in the dead center position. In the absence of any special precautions the bolt 32 goes beyond its dead center position and the spring 33 is released under corresponding roation of the cam 4 to turn the circuit breaker on. In this design the drive mechanism acts without delay.

If, however, the drive mechanism functions as a storage drive, it is necessary to maintain the tensioned condition of the spring 33 up to the desired moment. For this purpose it is usual to provide a detachable lug against which bolt 32 rests if it has stepped slightly beyond its dead center position. From the representation and description of the parts belonging to said mechanism, it can be seen in relation to the above that generally well-known features are involved. In the following, however, the parts of a mechanism will be described that serves to prevent further transmission of drive energy to the shaft 3 once the latter has reached the end position in tensioning the spring 33. For this purpose cage disks 83 are positioned on both sides of the outer part 52 and fitted on their inner circumference with the recesses 84 gripping the clamp rolls 51. By rotating the cage disks 83 relative to the outer part 52 all clamp rollers 51 can thus be simultaneously pressed out of their operating position in which they produce a junction of forces between the outer part 52 and the inner part 45. This takes place after the bolt 32 has moved beyond the dead center position through the fact that a cam 85 positioned on the inner part runs against a tappet 86 of a two-armed release lever 87, which is mounted so as to swivel on a pin 90 and which in normal condition is laid against a lug 92 through a tension spring 91. The longer limb 88 of the release lever 87, away from the tappet 86, is bow-shaped on its inner flank in order to obtain ease of cooperation with a roller 93 seated on the toggle joint bolt 94 of toggle levers 95 and 96. The toggle lever 95 is flexibly connected to the outer part 52, while the toggle lever 96 grips on the cage disk 83. In the normal position of the release lever 87 the toggle levers 95 and 96 are bent in, whereby the clamp rolls are freely movable in the recesses 84 and hence their function is not affected.

If the cam 85 now runs against the tappet 86 of the release lever 87, the latter is swivelled clockwise around its bearing pin 90, causing the shank 88 of the release lever 87 to actuate the roller 93 and to bring the toggle levers 95 and 96 to their extended position. At the same time a rotation of the cage disk 83 by an angle sufficient to carry along the clamp rolls 51 takes place, through which transmission of a mechanical force from the outer part 52 to the inner part 45 is interrupted. Thereby the traction member 56 is decoupled from the driving force, whether it be supplied by the motor 70 or by the hand lever 63. As can be seen, the longer limb 88 of the release lever 87 is fitted with a right-angle bend 89 so that limb 88 can be led laterally past the traction member 56 and can cooperate with the roller 93 lying concentrically in relation to the traction member.

FIG. 3 shows the advantages obtainable through use of a flexible traction member in circuit breaker drive mechanisms. A far-reaching freedom of movement exists, in particular, due to the spatial arrangement of the components to be interconnected. For example, assuming a given position of the shaft 3 inside the housing 68, it would not be difficult to considerably adjust the positions of the shafts 62 and 67 and also the guide means (parts 72, 73). The traction member 56 can be adapted without regard to tolerances to said conditions simply by taking a corresponding length from a reserve supply. If a cable traction be fitted in place of the strip traction described in this example, it would also be possible to interconnect shafts which in contrast to this example are positioned at an angle to each other.

It was already mentioned that a flexible traction member is in principle also suitable for driving a directional coupling operating with drive and locking catches. Here the advantage is already obtained that the length tolerances applicable to push or drive rods no longer apply. It would also be conceivable to combine a push rod with a clamp-roll freewheel. Thus a wider range of stepping angles would be obtainable for the shafts to be driven, as there is no dependency on a set angular division as with ratchet wheels. The combination described above of the flexible traction member with a clamp-roll freewheel nevertheless shows the special characteristic that any idle steps are avoided and thus the stroke movement of the eccentric members 61 and 66 is fully converted to a swivelling of the outer part 52. Moreover, there are no sudden impact strains on all mutually operating parts, which fact results in a quieter motion of the drive mechanism and in increased operational life. Thus, it will now be understood that there has been disclosed a new drive mechanism for use in a circuit breaker which has eccentric members and a directional coupling to improve the previous length tolerance, and the high energy losses of most reliable and durable equipment problems experienced in other drive mechanisms. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit of the invention.

What is claimed as new and desired to be secured by Letters Patent of the United States is:

1. A drive mechanism for a circuit breaker having an energy storage spring tensionable by means of a crank pin seated upon a shaft rotatable by a motor through a first rotatingly driveable eccentric member by a directional coupling seated on the shaft, comprising:

a cooperating pair of contacts operable by said energy storage spring;

a flexible traction member connected to the directional coupling; and an additional eccentric member seated on a shaft of a hand lever, located between the first eccentric member and the directional coupling, said additional eccentric member being at least partially wrapped around by the traction member.

2. A drive mechanism for a circuit breaker according to claim 1, wherein both ends of the traction member are connected to the directional coupling at a drive component thereof; and the traction member is located at least partially wrapped around at least one of the eccentric members providing a counter-bearing.

3. A drive mechanism for a circuit breaker according to claim 1, further comprising a guide means for the traction member for changing a path of the flexible traction member.

4. A drive mechanism for a circuit breaker according to claim 2, further comprising a guide means for changing any paths of the traction member.

5. A drive mechanism for a circuit breaker according to claim 3, wherein the guide means is displaceable by a drive force for activating the traction member.

6. A drive mechanism for a circuit breaker according to claim 4, wherein the guide means is displaceable by a driving force for activating the traction member.

7. A drive mechanism for a circuit breaker according to claim 3, further comprising:

a rolling bearing having an outer ring surrounding the first eccentric member providing a bearing surface for the traction member;

a rolling bearing having an outer ring surrounding the additional eccentric member providing a bearing surface for the traction member;

at least one rolling bearing having an outer ring surrounding the guide means providing a bearing surface for the traction member.

8. A drive mechanism for a circuit breaker according to claim 4, further comprising:

a rolling bearing having an outer ring surrounding the first eccentric member providing a bearing surface for the traction member;

a rolling bearing having an outer ring surrounding the additional eccentric member providing a bearing surface for the traction member; and at least one rolling bearing having an outer ring surrounding the guide means providing a bearing surface for the traction member.

9. A drive mechanism for a circuit breaker according to claim 5, further comprising:

a rolling bearing having an outer ring surrounding the first eccentric member providing a bearing surface for the traction member;

a rolling bearing having an outer ring surrounding the additional eccentric member providing a bearing surface for the traction member; and at least one rolling bearing having an outer ring surrounding the guide means providing a bearing surface for the traction member.

10. A drive mechanism for a circuit breaker according to claim 6, further comprising:

a rolling bearing having an outer ring surrounding the first eccentric member providing a bearing surface for the traction member;

a rolling bearing having an outer ring surrounding the additional eccentric member providing a bearing surface for the traction member; and at least one rolling bearing having an outer ring surrounding the guide mechanism means providing a bearing surface for the traction member.

11. A drive mechanism according to claim 1, further comprising:

a flexible steel strip as the traction member; and restoring force means for activating the drive component of the directional coupling in order to tension the flexible steel strip.

12. A drive mechanism according to claim 1, further comprising a clamp-structure free wheel as the directional coupling having the clamp rollers movable to an ineffective position by at least one actuator when the shaft has reached an end position.

13. A drive mechanism according to claim 1, further comprising a clamp-structure free wheel as the directional coupling having clamp structures which move to an ineffective position by at least one actuator when the shaft has reached an end position.

* * * * *